United States Patent
Zayas et al.

(10) Patent No.: US 6,477,583 B1
(45) Date of Patent: Nov. 5, 2002

(54) INFRASTRUCTURE FOR SUPPORTING FILE REPLICATIONS

(75) Inventors: Edward R. Zayas, Salem; Changju Gao, Provo, both of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/441,189

(22) Filed: Nov. 15, 1999

(51) Int. Cl.$^7$ .............................................. G06F 15/16
(52) U.S. Cl. ...................... 709/248; 707/202; 707/203; 714/4; 714/6
(58) Field of Search ................................. 709/248, 220, 709/201, 205, 215, 219; 707/8, 10, 200–201, 202–204, 500, 524; 714/4, 5–6

(56) References Cited

U.S. PATENT DOCUMENTS

| | | | |
|---|---|---|---|
| 4,432,057 A | * | 2/1984 | Daniell et al. |
| 5,452,448 A | * | 9/1995 | Sakuraba et al. |
| 5,586,310 A | * | 12/1996 | Sharman |
| 6,158,008 A | * | 12/2000 | Arturo et al. |
| 6,163,856 A | * | 12/2000 | Dion et al. .................... 714/4 |
| 6,192,365 B1 | * | 2/2001 | Draper et al. ................ 707/101 |
| 6,233,589 B1 | * | 10/2001 | Muralidhar et al. |

* cited by examiner

*Primary Examiner*—Ario Etienne
(74) *Attorney, Agent, or Firm*—Marger Johnson & McCollom, P.C.

(57) ABSTRACT

An infrastructure on a file server registers one or more replication modules to support file replication across a plurality of file servers. Each replication module can support file replication for any number of volumes on the file server, but each volume can be replicated by at most one replication module. The replication modules register with the replication module by identifying themselves to the replication infrastructure, identifying those activities the replication modules wish to be notified about, and identifying those volumes each replication module will support. The replication infrastructure tracks each volume. When a watched activity occurs, the replication infrastructure notifies the supporting replication module. Finally, when the replication infrastructure receives an update from the replication module, the replication infrastructure performs the update to the supported volume.

37 Claims, 10 Drawing Sheets

INFRASTRUCTURE FOR SUPPORTING FILE REPLICATIONS

FIELD OF THE INVENTION

This invention pertains to networking of computers and more particularly to file replication among computer in a network.

BACKGROUND OF THE INVENTION

File Replication is a convenient way to automatically distribute data stored in files to users, and is widely used in many environments, such as mobile computing, software distributing and data sharing. A good replication method can improve reliability, availability, local autonomy, load balancing, and data access performance.

A simple example of file replication is shown in FIG. 1. In FIG. 1, the system 100 includes a volume of same files that exist in each of the three networked systems S1 105, S2 110, and S3 115. For example, file 120 on system S1 105 is replicated as file 120A on system S2 110, and as file 120B on system S3 115. The major goal of replication is to maintain the volumes consistent with each other. If someone modifies a file 120 in S1 105, this modification should be reflected in copies of that file 120A and 120B in S2 110 and S3 115. A replication module must detect the modification in S1 105, and modify the files in S2 110 and S3 115 accordingly.

There are many different ways of performing replication. For example, in peer-to-peer replication, a system may exchange replication information with any of the other systems directly. Another example is store-and-forward replication, where replication information is transmitted along pre-defined routes similar to emails. There are tight replication algorithms, in which any modification to a file will be seen at all locations immediately, and loose replication algorithms, in which modifications will be propagated to other locations periodically.

Currently, different systems offer different support modules for replications. A replication module designed to replicate files in one system usually cannot work in another system without heavy changes of the module. In other words, replication modules inherently have poor portability.

A further problem is ordering the replication of data changes. When a number of pieces of data have been modified at one of the systems, a replication module may have to decide the order of processing the modified pieces. Because resources are limited, the order of processing may affect the overall performance substantially. If a replication module chooses to replicate the following three kinds of pieces before others, the overall performance will likely suffer:

Large pieces of data (which will increase delay time)

Pieces of data that are likely to be modified again (which might have to be replicated repeatedly)

Pieces of data that are less likely to be accessed at the destinations (which can waste needed resources at this point)

Existing replication modules do not have any strategy to make good choices without outside help in such situations, so there is nothing to prevent them from selecting these three kinds of pieces first. Most existing replication modules process modified pieces of data on a first-come-first-serve basis, even if information useful to make intelligent choices, such as data length, is conveniently available to them. In other words, replication modules are dealing with data all the time, yet they fail to take advantage of that experience in doing their jobs.

U.S. Pat. No. 4,432,057 to Daniell et al., issued Feb. 14, 1984, titled "Method for the Dynamic Replication of Data Under Distributed System Control to Control Utilization of Resources in a Multiprocessing, Distributed Data Base System," and U.S. Pat. No. 4,620,276 to Daniell et al., issued Oct. 28, 1986, titled "Method and Apparatus for Asynchronous Processing of Dynamic Replication Messages," are remotely related patents. The Daniell patents primarily focus on how to process replication tasks based on status of system resources and pre-defined user preference. However, the Daniell patents require extensive overhead, are not transparent to administrators/users of data replications, and do not substantially improve overall performance.

Accordingly, needs remain for an infrastructure that supports various replication modules and implementations, and for a replication method that can utilize information about the data stream to transparently optimize file replication with little overhead.

SUMMARY OF THE INVENTION

An infrastructure on a file server can register one or more replication modules to support file replication across a plurality of file servers. Each replication module can support file replication for any number of volumes on the file server. Registering the replication module includes the replication module identifying itself to the replication infrastructure, identifying those activities the replication module wishes to be notified about, and identifying those volumes the replication module will support. The replication infrastructure is responsible for tracking activities on each volume and informing the supporting replication module when a watched activity occurs. The replication infrastructure is also responsible for receiving an update from the replication module, and applying the update to the supported volume.

The foregoing and other features, objects, and advantages of the invention will become more readily apparent from the following detailed description, which proceeds with reference to the accompanying drawings.

DETAILED DESCRIPTION OF THE PREFERRED EMBODIMENT

I. The Replication Infrastructure

Figure 1:
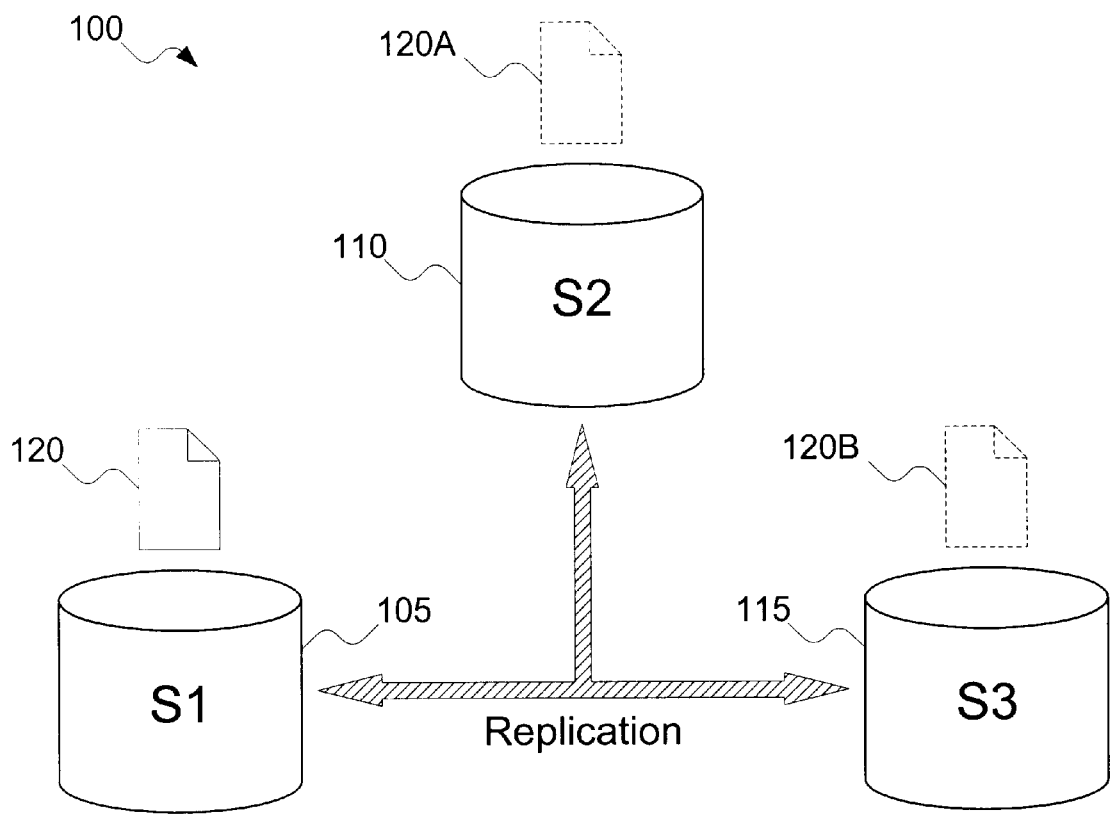
FIG. 1 is a block diagram of a network that shows how replication of volumes is done in the prior art.
Figure 2:
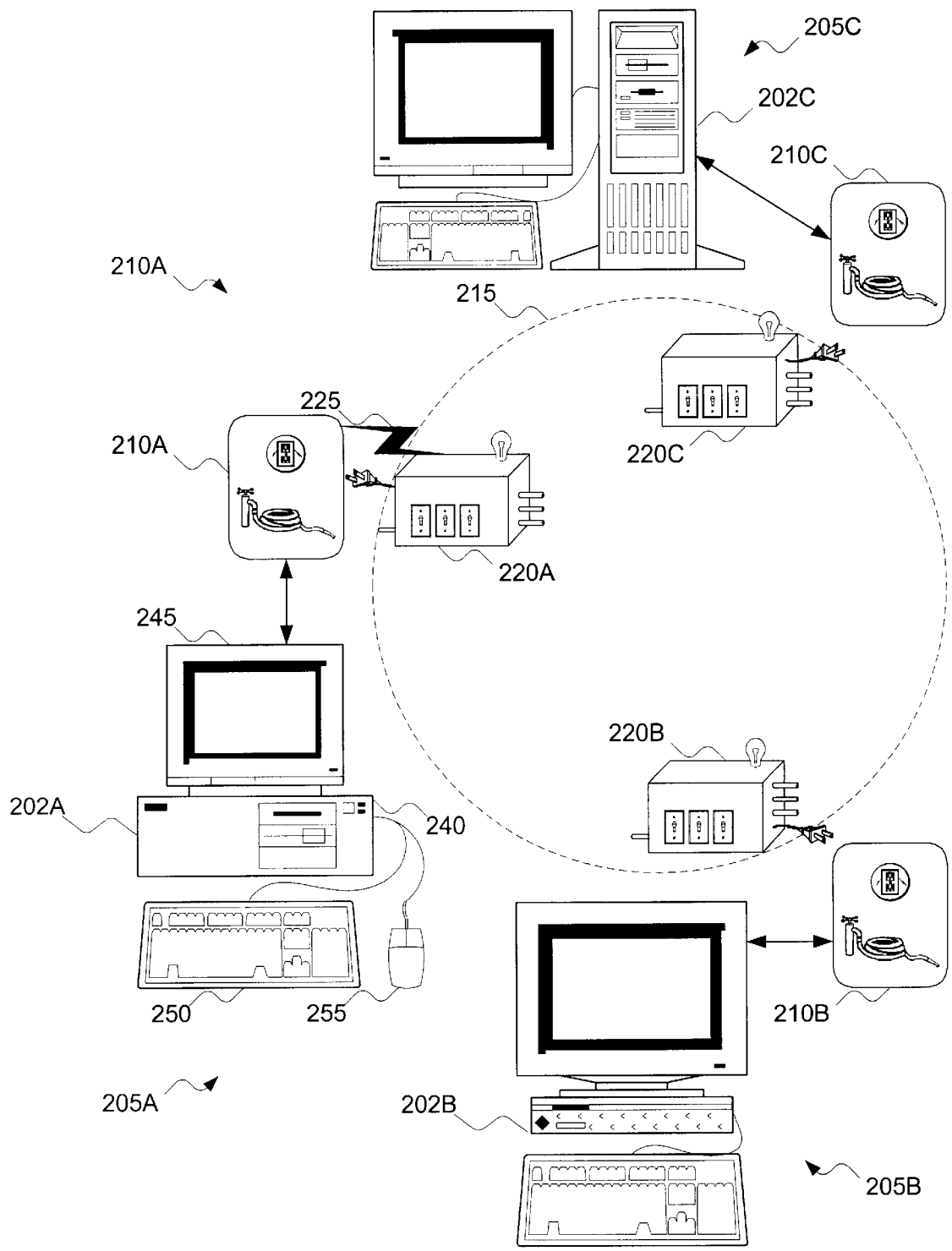
FIG. 2 is a pictorial diagram that shows the use of replication infrastructures and replication modules to support replication of volumes across networked file servers according to the invention.

FIG. 2 shows the relation between the infrastructure and a replication module according to the invention in a system 200. In FIG. 2, there are three computers configured as file servers 202A, 202B, and 202C, respectively supporting file systems 205A, 205B, and 205C. However, a person skilled in the art will recognize that the infrastructure is extendable to any number of servers and file systems. Each file server 202A, 202B, and 202C can include a computer 240, a monitor 245, and a keyboard 250. Included but not shown in computer 240 are a Central Processing Unit (CPU), a network circuit, and a memory for storing the file systems 205A, 205B, and 205C. Also not shown are the conventional operating system for, among other things, managing storage functions and the conventional networking circuitry and software. Optional equipment, such as a printer (not shown) or a mouse 255 or other pointing device (not shown) can be included in file servers 202A, 202B, and 202C.

Instances of the infrastructure 210A, 210B, and 210C are built on top of file systems 205A, 205B, and 205C. The servers and their respective file systems 205A, 205B, and 205C (and hence the replication infrastructures 210A, 210B, and 210C) are interconnected via a network 215. The user does not see network 215 directly, but network 215 does exist. In general, each file system 205A, 205B, and 205C stores several volumes of files, each of which can be replicated on a different set of file servers.

The replication infrastructure 210A, 210B, and 210C should be distributed to each file system 205A, 205B, and 205C. The infrastructure provides services similar to that of power outlets and water lines, so replication modules 220A, 220B, and 220C can be plugged into the instances of the infrastructure 210A, 210B, and 210C as shown. File systems 205A, 205B, and 205C are hidden from replication modules 220A, 220B, and 220C by replication infrastructures 210A, 210B, and 210C, even though replication modules 220A, 220B, and 220C are usually driven by activities on file systems 205A, 205B, and 205C.

Figure 2A:
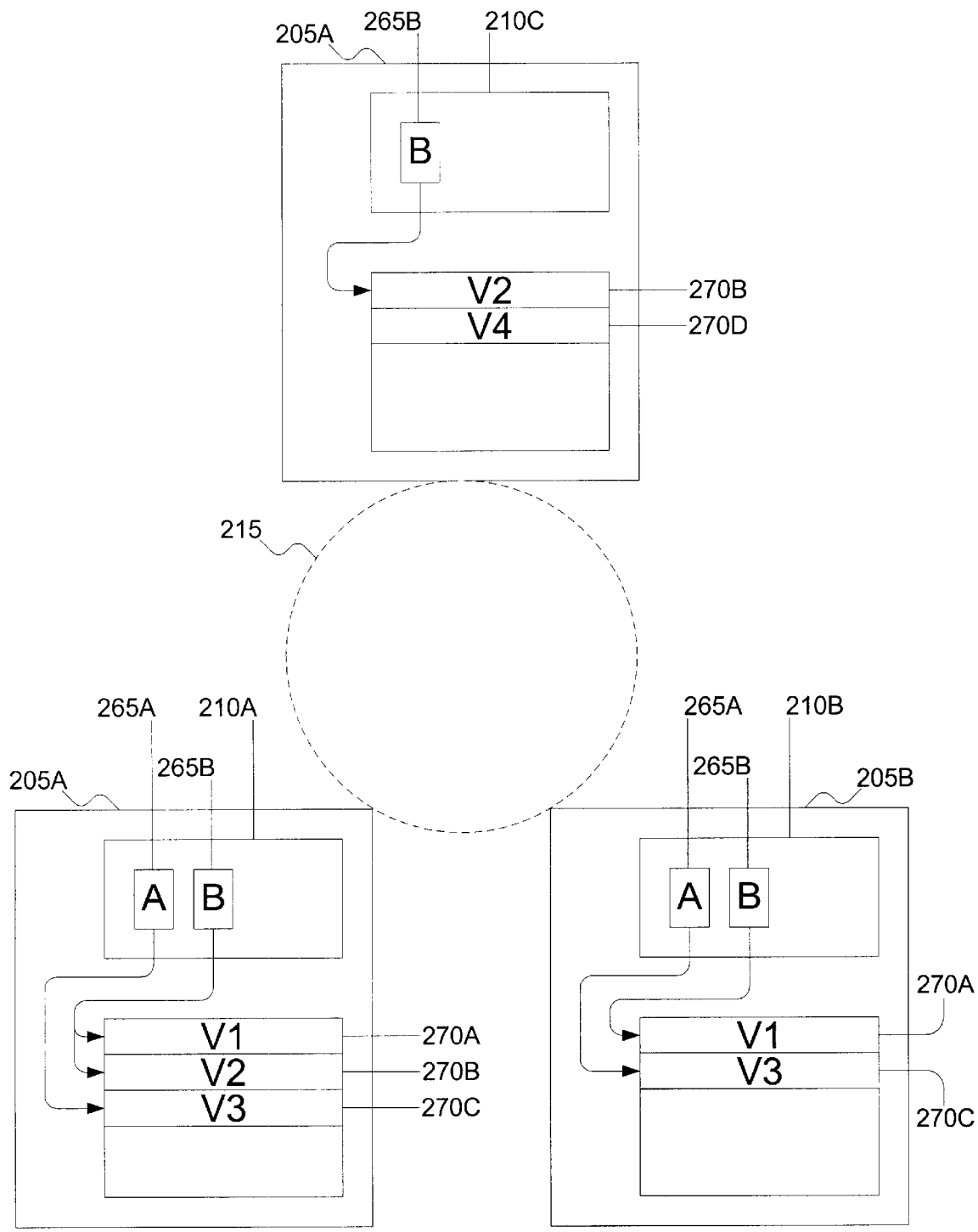
FIG. 2A is a block diagram further detailing the relationships of the replication infrastructures, replication modules, and file system volumes of FIG. 2.

FIG. 2A shows more detail about the relationship between the replication infrastructures, replication modules, and file system volumes of FIG. 2. In FIG. 2A, each file system 205A, 205B, and 205C has a replication infrastructure 210A, 210B, and 210C. Each replication infrastructure 210A, 210B, and 210C can have any number of replication modules plugged into the replication infrastructure 210A, 2101B, and 210C. For example, replication infrastructures 210A and 210C have two replication modules A 265A and B 265B plugged into them, whereas replication infrastructure 210B has only replication module B 265B plugged into it. A person skilled in the art will recognize that a replication infrastructure 210A, 210B, and 210C can support any number of replication modules 265A and 265B.

Each replication module 265A and 265B registered with replication infrastructures 210A, 210B, and 210C can support any number of volumes on a given file system. For example, on file system 205A, replication module A 265A supports one volume V3 270C, and replication module B 265B supports two volumes V1 270A and V2 270B. On file system 205B, replication module A 265A supports volume V3 270C (a replica of volume V3 270C on file system 205A), and replication module B 265B supports volume V1 270A (a replica of volume V1 270A on file system 205A). On file system 205C, replication module B 265B supports volume V2 270B (a replica of volume V2 270B on file system 205A). Volume V4 270D on file system 205C is not replicated onto any other file systems, and is not supported by a replication module.

As FIG. 2A shows, a single replication module (e.g., replication module B 265B) can support multiple volumes. Further, the file replication pattern for each volume supported by a replication module A 265A or B 265B can differ, as shown by the different file replication patterns for volumes V1 270A and V2 270B. The are only two limitations to the use of replication modules. First, a volume 270A, 270B, or 270C can be supported by at most one replication module A 265A or B 265B on an individual file system 205A, 205B, or 205C. Second, each volume 270A, 270B, or 270C must be supported by the same replication module A 265A or B 265B on each file system 205A, 205B, or 205C on which the volume 270A, 270B, or 270C is replicated.

One advantage of the replication infrastructure 210A, 210B, and 210C is that each volume on the file system 205A, 205B, and 205C incurs only the overhead required by the particular replication module 220A, 220B, and 220C supporting that volume. If one replication module A 265A or B 265B happens to require a large overhead to keep replicated volumes consistent, only volumes supported by that replication module A 265A or B 265B incur the overhead: other volumes on the file server 205A, 205B, and 205C will not suffer.

Figure 3:
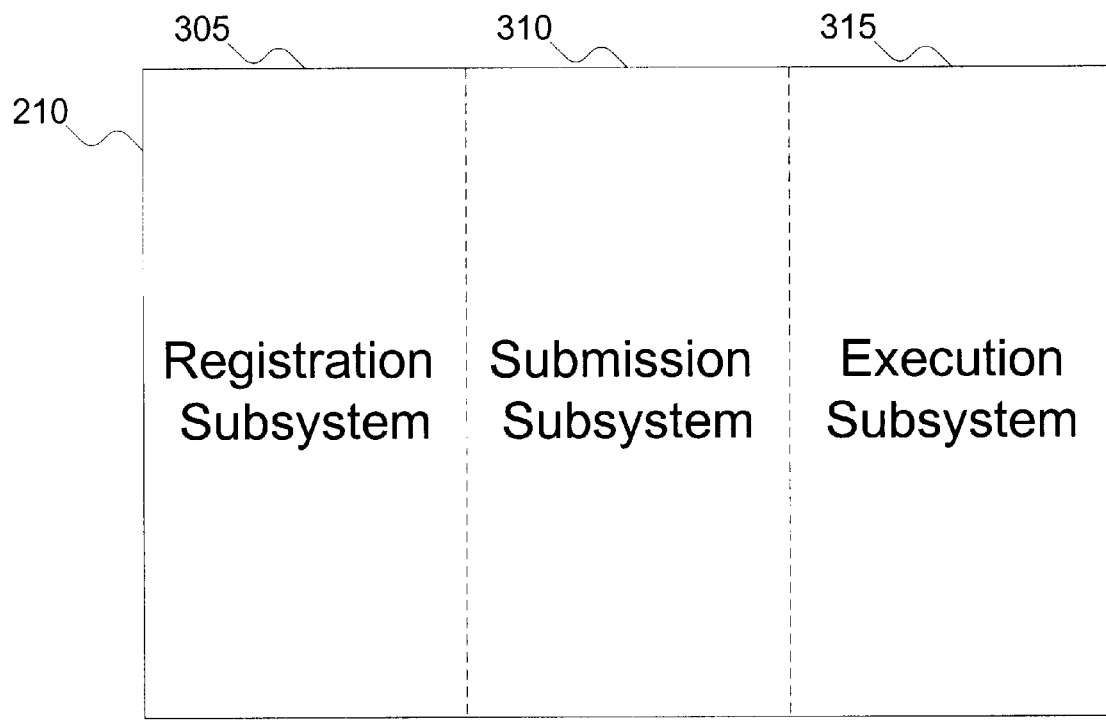
FIG. 3 is a diagram that shows the three components of the replication infrastructure of FIG. 2.

As shown in FIG. 3, each replication infrastructure 210A, 210B, and 210C includes of three components: a registration subsystem 305, a submission subsystem 310, and an execution subsystem 315. The registration subsystem 305 allows replication modules 220A, 220B, and 220C to present themselves to the replication infrastructures 210A, 210B, and 210C by registering various callbacks functions, including functions to accept submissions. For example, in FIG. 2, replication infrastructure 205A and replication module 220A are communicating through a callback function 225. Through registration, replication modules 220A, 220B, and 220C can also express their interests in receiving notifications of changes to file system.

The submission subsystem 310 detects changes to file systems and submits notifications of changes to registered replication modules. As a result, most of the interactions from the replication infrastructures 210A, 210B, and 210C to replication modules 220A, 220B, and 220C are submissions of notifications.

The execution subsystem 315 processes the replicated notifications at their destinations. Housekeeping operations are provided for replication modules 220A, 220B, and 220C, and locks are also provided to support some tight replication algorithms.

Because the infrastructure submits notifications to replication modules and processes notifications delivered by replication modules 220A, 220B, and 220C, replication modules 220A, 220B, and 220C only need to understand very little about notifications. As a result, replication modules 220A, 220B, and 220C based on the replication infrastructures 210A, 210B, and 210C will be much more portable.

The replication infrastructures 210A, 210B, and 210C can also support various replication algorithms, such as peer-to-peer, store-and-forward, tight and loose replications. The notification structure is highly extensible to support future replication technologies.

Figure 4:
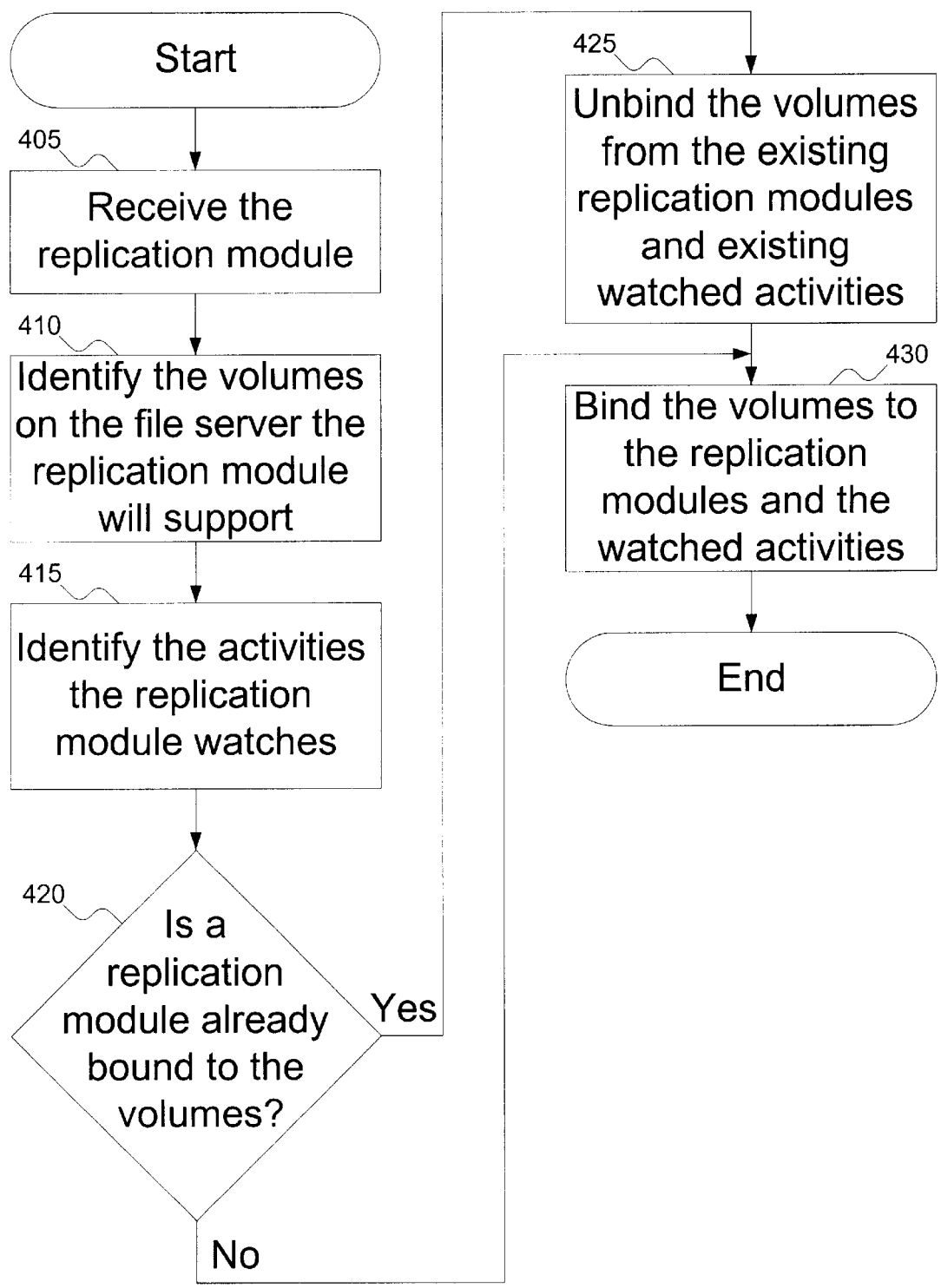
FIG. 4 is a flowchart showing how a replication module is registered with the replication infrastructure and bound to volumes on a file server in the network of FIG. 2.

FIG. 4 shows a flowchart of how the registration subsystem 305 registers a replication module with the replication infrastructure and binds the replication module to volumes on the file server the replication module will support. "Binding" the replication module to the supported volumes is the process of associating the replication module with the volume in the internal structure of the replication infrastructure. "Binding" can be done through a data structure pairing volumes with their supporting replication modules, but a person skilled in the art will recognize that other techniques can be used to bind a replication module to a volume. At step 405, the replication module presents itself to the replication infrastructure. This is the registration process. At step 410, the replication module identifies which volumes it will support on the file server. At step 415, the replication module identifies the types of activities the replication module wishes to be notified about. Watched activities include, for example, data changes, changes in trusteeship of the data, and permission changes to the data. For example, a replication module might be interested only in making small updates locally. The replication module would then inform the replication infrastructure that the replication module should be notified of changes no larger than, say, one kilobyte in size. The replication infrastructure then would not report any larger changes in the supported volumes.

Before the replication infrastructure can bind the replication module to the identified volume, the replication infrastructure checks to see if any replication module currently supports the identified volume. If, at step 420, the identified volume is already supported by a replication module, then at step 425 the replication infrastructure unbinds the identified volume from the existing replication module and the existing replication module's watched activities. "Unbinding" the replication module from the supported volumes is the process of severing the association between the replication module and the volume in the internal structure of the replication infrastructure. Finally, at step 430, the infrastructure binds the identified volumes to the replication modules and the watched activities. Then, when any activity occurs in an identified volume, the replication infrastructure can check to see if the supporting replication module watches that activity and, if the supporting replication module does watch that activity, the replication infrastructure can inform the supporting replication module of the activity.

A person skilled in the art will recognize that steps 405, 410, and 415 do not have to occur in any particular order, provided that before any volume can be supported by a replication module, the replication module is completely registered and bound to the volume. A person skilled in the art will also recognize that steps 405, 410, and 415 do not have to occur at the same time. A replication module can register itself (step 405) with the replication infrastructure and not be bound to any volume until much later, if ever. (But until the replication module is both registered with the replication infrastructure and bound to a volume, the replication module's utility is severely limited.) A replication module that has previously registered with the replication infrastructure and been bound to some volumes on the file server can also add a new volume on the file server to support. Finally, a person skilled in the art will recognize that a replication module can be unbound from a currently supported volume on the file server. This is akin to changing the binding to a null replication module and comprises step 425.

Figure 5:
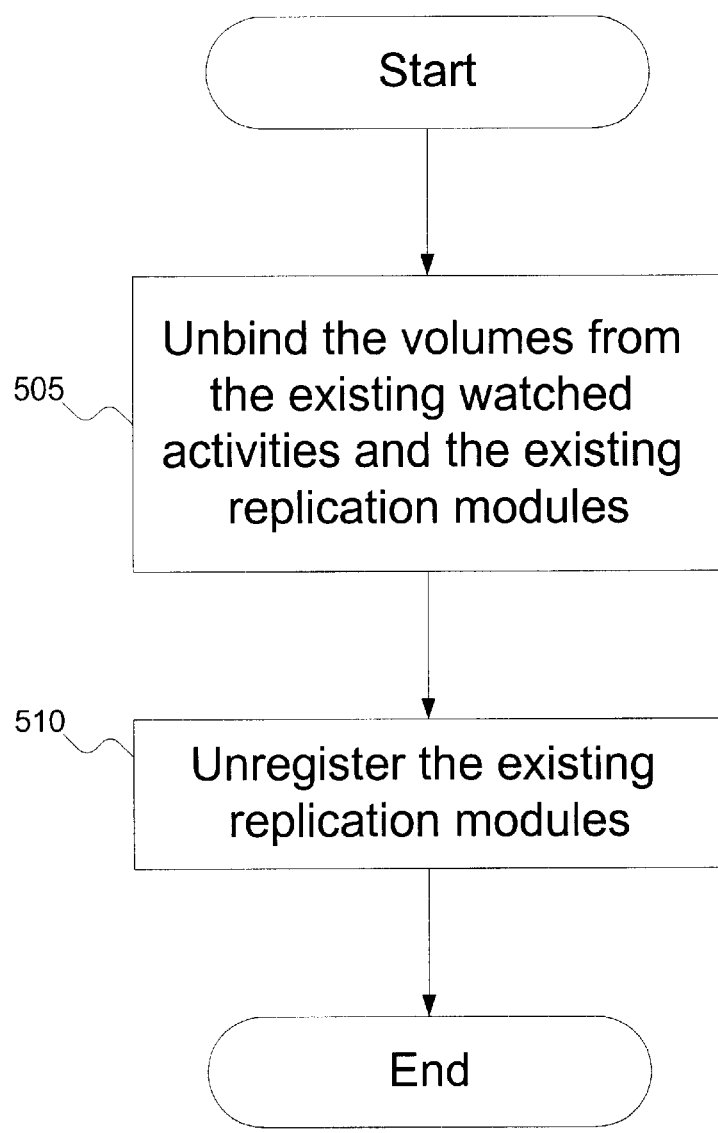
FIG. 5 is a flowchart showing how a replication module is un-registered from a replication infrastructure in a file server in FIG. 2.

FIG. 5 shows a flowchart of how the registration subsystem 305 un-registers a replication module from a replication infrastructure. First, at step 505, the replication infrastructure unbinds any volumes the replication module currently supports from the replication module and its list of watched activities. For example, if a table is used to pair replication modules to volumes internal to the infrastructure, unbinding a replication module from a volume is accomplished by erasing the replication module from the table entry for the volume. However, a person skilled in the art will recognize that other techniques can be used to unbind a replication module from a volume. Then, at step 510, the replication module is unregistered from the replication infrastructure.

Figure 6:
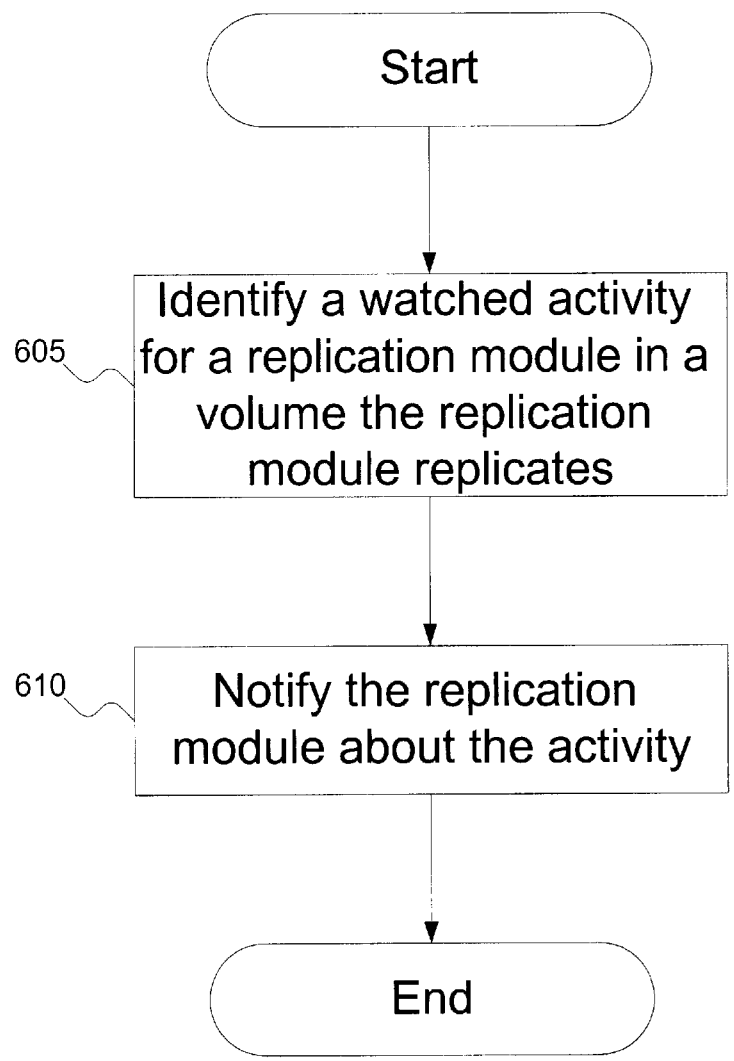
FIG. 6 is a flowchart showing how the replication infrastructure notifies a replication module in a file server of FIG. 2 that a watched activity has occurred in a supported volume.

FIG. 6 shows a flowchart of how the submission subsystem 310 notifies a replication module that a watched activity has occurred in a supported volume. First, at step 605, the replication infrastructure watches to see if a watched activity has occurred. Then, when a watched activity occurs, at step 610 the replication infrastructure notifies the supporting replication module of the activity. This notification can be done via a callback function, as discussed earlier or by use of a shared data structure. However, a person skilled in the art will recognize that other techniques can be used to notify a replication module of an activity in a supported volume.

Figure 7:
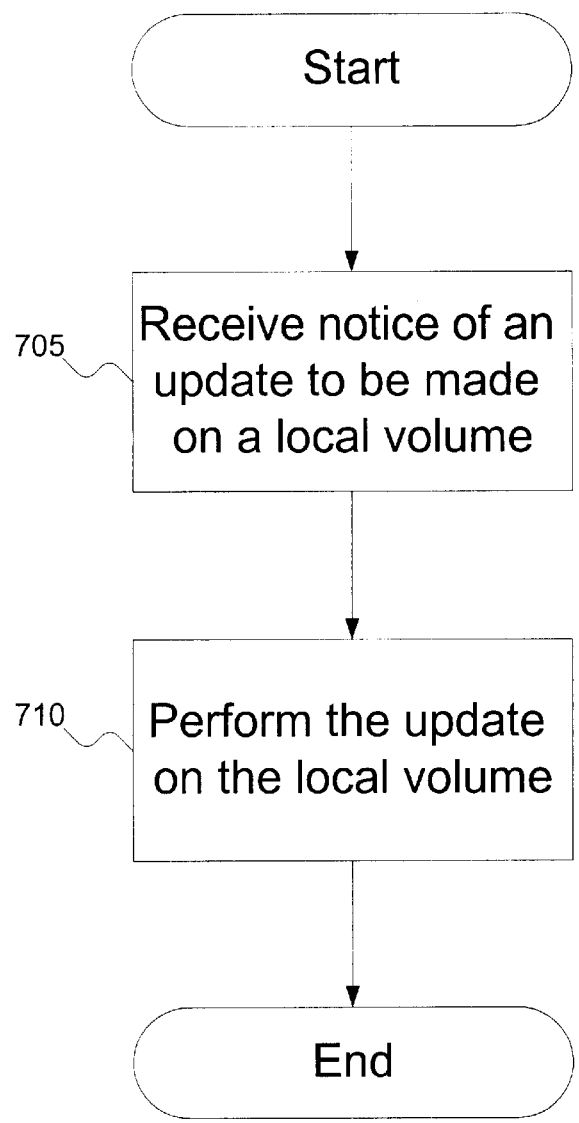
FIG. 7 is a flowchart showing how the replication infrastructure makes a local change to a volume in a file server of FIG. 2 as directed by a replication module.

FIG. 7 shows a flowchart of how the execution subsystem 315 makes a local change to a volume as directed by a replication module. This method would be used when the replication module receives notice of a change from a remote copy of the volume that needs to be made locally. First, at step 705, the replication infrastructure receives notice of the change from the replication module. This notification can be done via a callback function or by use of a shared data structure. However, a person skilled in the art will recognize that other techniques can be used to notify a replication infrastructure to make a local change. Then, at step 710, the replication infrastructure makes the change as instructed by the replication module.

A person skilled in the art will recognize that, in FIG. 7, the replication module is responsible for deciding whether or not to make a change locally. Once the replication infrastructure receives notice of a change at step 705, the replication module has already decided that a remote change should be echoed locally.

II. The Replication Method

In the following description, the replication method will be described as a replication module for use with the replication infrastructure described above. However, a person skilled in the art will recognize that the replication method is adaptable for use outside the context of the above-described replication infrastructure.

In the preferred embodiment, the information needed to make intelligent decisions includes data lengths and usage frequencies. A point system can be used to calculate the priorities of different chunks of data, and data chunks can be replicated according to their priorities. The overall performance of the data replication method can be improved by replicating the following kinds of data before others:

Pieces of data that are short in length
Pieces of data that are less like to be modified again
Pieces of data that are likely to be accessed in other places
A person skilled in the art will recognize that other criteria can be used to order data for replication.

If short data are replicated earlier, the overall delay time will be reduced. If stable data are replicated earlier, repeatedly replications of unstable data may be avoided. If more-needed data are replicated earlier, this action can reduce the delay time and increase the overall performance by scheduling less needed data when the systems are less busy.

The data lengths and modification possibilities can be tracked and determined locally with virtually no overhead. To determine the data access rates on other systems requires coordination and communication. Since the access rate is only one of the three factors in determining the order of processing, heuristics or approximation algorithms can be used to roughly track and calculate the access rates for each of the replica server. The order of processing can also be determined without considering the access rates at all.

Since replication products are dealing with data all the time and have to detect accesses to the data, keeping track of usage should be simple and have little overhead. The usage frequency for a piece of datum on a particular system includes two parts: how often the datum was modified, and how often the datum was accessed (other than for modifications). These statistics can be tracked, for example, by using two counters, one to track changes and one to count accesses. The replication product could increment these counters as these activities occur. However, a person skilled in the art will recognize that other techniques can be used to track these frequencies.

Figure 8:
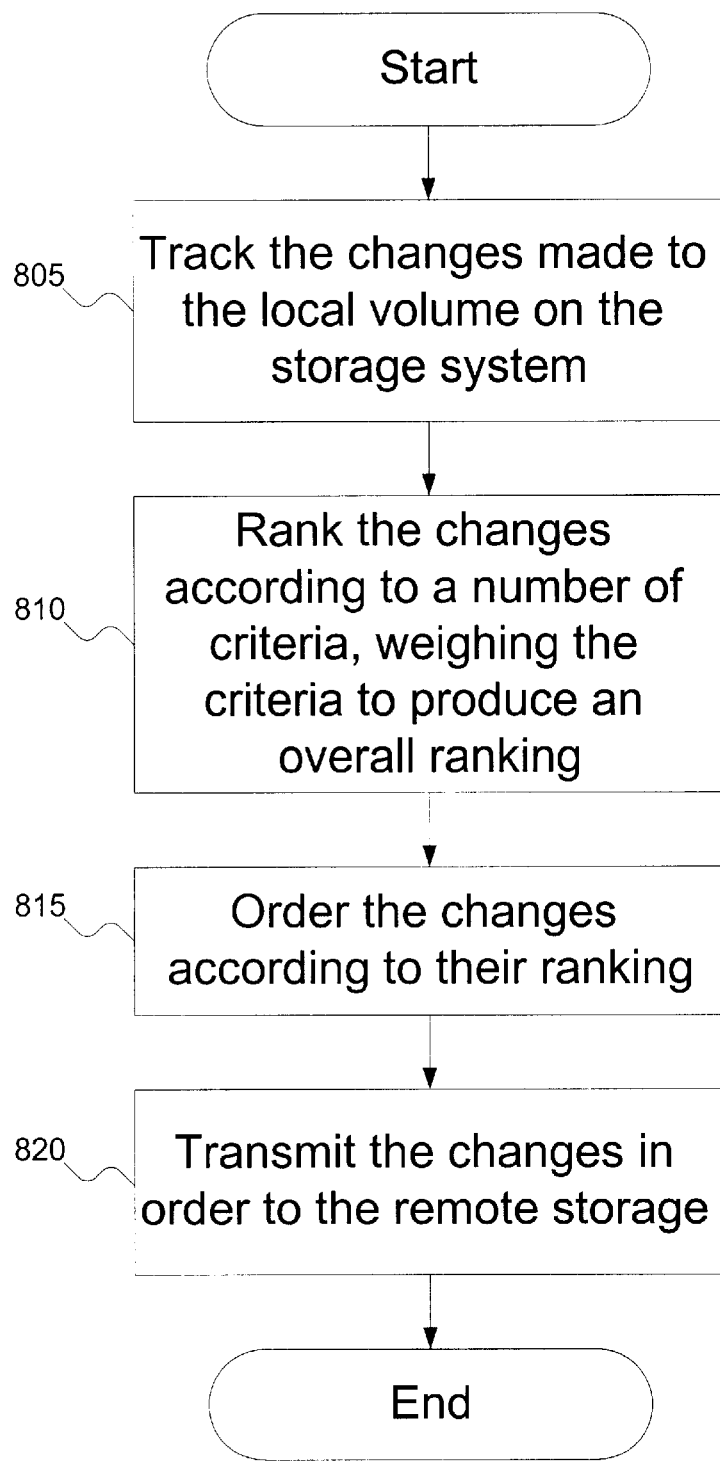
FIG. 8 is a flowchart showing how the replication method performs replication to remote storage systems in the network of FIG. 2.

FIG. 8 shows a flowchart of how the replication method performs replication of data changes from the local storage system. At step 805, the replication method tracks the changes that have been made locally. Where a replication infrastructure is used, the replication method depends on the replication infrastructure to inform the replication method of when a data change has occurred, as discussed above. At step 810, the replication method ranks the changes according to a number of criteria. In the preferred embodiment, three criteria are used: datum length, the likelihood of repeated datum modification, and the likelihood of remote access to the datum. However, a person skilled in the art will recognize that more, fewer, or other criteria can be used to rank the changes. Where, as in the preferred embodiment, multiple criteria are used to rank the changes, the changes are ranked by weighting the various criteria. At step 815, the changes are put into an overall order according to their rank. If new changes occur after some of the changes have been transmitted, the new changes are ranked, and then all the remaining changes are re-ordered. The re-ordering can be done by recalculating the ranks of the remaining changes, or their ranks could be stored in a data structure internal to the replication product. A person skilled in the art will also recognize that other techniques could be used to re-order the changes. Then, at step 820 the changes are transmitted in order to the remote storage systems for replication.

Figure 9:
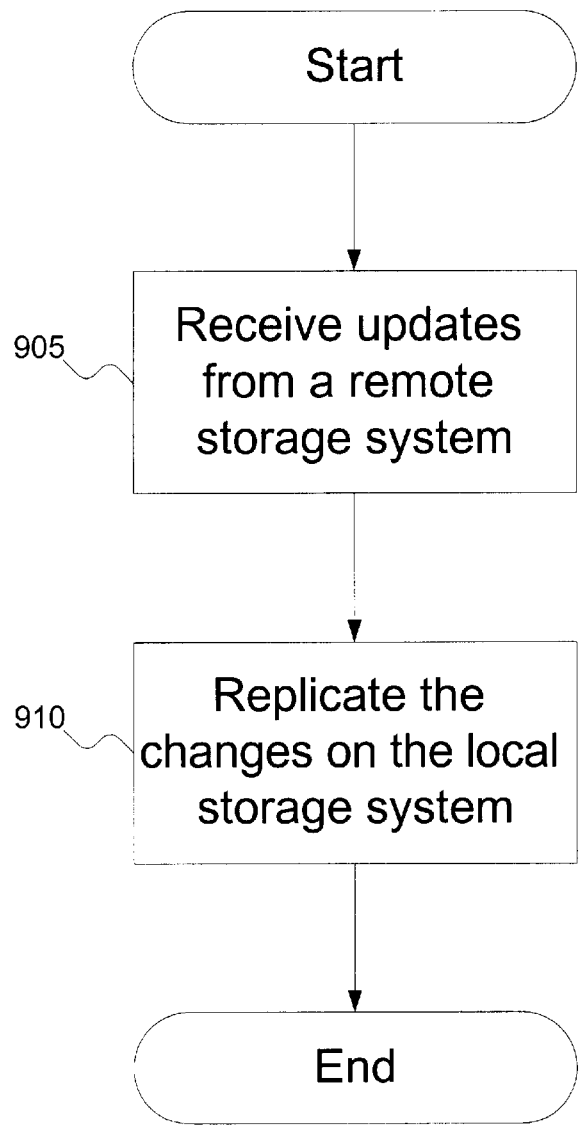
FIG. 9 shows a flowchart of how the replication method locally performs a change to a volume in a file server of FIG. 2 to replicate a change on a remote file server of FIG. 2.

FIG. 9 shows a flowchart of how the replication method performs locally a change to the volume to replicate a change on a remote storage system. At step 905, the replication method receives the updates from a remote storage system. Then, at step 910, the replication method performs the update on the local storage system. Where a replication infrastructure is used, the replication method simply passes instructions to the replication infrastructure to duplicate the changes on the local volume. Where the replication product itself is responsible for making the changes, the replication product can replace an existing file with the newer version of the file, or the replication product can make a change to the file as instructed by the remote storage system. A person skilled in the art will also recognize that other techniques can be used to perform the update on the local storage system.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for using an infrastructure coupled to a first file server storing one or more volumes of files to support file replication among a plurality of second file servers connected by a network, each second file server coupled to a second infrastructure, the method comprising:

registering a replication module with the first infrastructure on the first file server for at least one of the volumes on the first file server; and processing changes on the at least one of the volumes on the first file server using the replication module.

2. A method according to claim 1 wherein processing changes on the first file server includes:

receiving notification of an activity on a second file server over the network from the replication module; and performing the activity on the first file server.

3. A method according to claim 2 wherein:

receiving notification of an activity includes receiving instructions to update the first file server; and performing the activity includes updating the first file server according to the instructions.

4. A method according to claim 2 wherein the activity on the second file server is a data change.

5. A method according to claim 1 wherein the replication module specifies what activities are to be replicated and when the activities are to be replicated.

6. A method according to claim 1 wherein registering a replication module includes:

receiving the replication module;

receiving an identifier for the at least one of the volumes on the first file server for which the replication module will operate; and binding the replication module to the at least one of the volumes.

7. A method according to claim 6 wherein registering a replication module further includes:

receiving a list of activities that the replication module watches; and binding the list of activities to the replication module and the at least one of the volumes.

8. A method according to claim 6 wherein binding the replication module includes:

unbinding a first replication module on the first file server from at least one of the volumes to which the replication module is bound; and binding the replication module to the at least one of the volumes.

9. A method according to claim 1 wherein registering a replication module includes unbinding the replication module on the first file server from the at least one of the volumes to which the replication module is bound.

10. A method according to claim 1 wherein the method further comprises un-registering the replication module from the first infrastructure on the first file server.

11. A method according to claim 10 wherein un-registering the replication module includes unbinding the replication module from all volumes to which the replication module is bound.

12. A method according to claim 1 wherein registering a replication module includes receiving callback functions for the first infrastructure to communicate with the replication module.

13. A method according to claim 1 wherein processing changes on the first file server includes:
   detecting an activity on the first file server that the replication module watches; and
   submitting the activity to the replication module.

14. A method according to claim 13 wherein the activity on the first file server is a data change.

15. A method according to claim 1 wherein registering a replication module includes registering more than one replication module with the first infrastructure on the first file server.

16. A method according to claim 1 wherein the replication module performs the steps of:
   receiving the changes from the first infrastructure on the first file server;
   prioritizing the changes according to a criterion; and
   sending the changes according to their priorities to the second infrastructure on one of the second file servers over the network.

17. A method according to claim 1 wherein registering a replication module includes unbinding a second replication module from the at least one of the volumes to which the second replication module is bound.

18. A first infrastructure coupled to a first file server storing one or more volumes of files for supporting file replication among a plurality of second file servers connected by a network, each second file server coupled to a second infrastructure, the first infrastructure including a computer-readable medium containing a program comprising:
   registration software to register a replication module with the first infrastructure on the first file server for at least one of the volumes on the first file server; and
   processing software to process changes to the at least one of the volumes on the first file server.

19. A first infrastructure according to claim 18 wherein the processing software includes:
   message reception software to receive notice of an activity on a second file server over the network from the replication module; and
   processing software to perform the activity on the first file server.

20. A first infrastructure according to claim 18 wherein the registration software includes:
   product identification software to receive the replication module;
   volume identification software to identify the at least one of the volumes on the first file server for which the replication module will operate; and
   binding software to bind the replication module to the at least one of the volumes.

21. A first infrastructure according to claim 20 wherein the binding software includes a binding data structure to bind the replication module to the at least one of the volumes.

22. A first infrastructure according to claim 18 wherein the processing software includes:
   detection software to detect an activity on the first file server that the replication module watches; and
   a message to submit the activity to the replication module.

23. A system for a first infrastructure coupled to a first file server storing one or more volumes of files to support file replication among a plurality of second file servers connected by a network, each second file server coupled to a second infrastructure, the system comprising:
   a registration unit to register a replication module with the first infrastructure on the first file server for at least one of the volumes on the first file server;
   a message reception unit to receive notice of an activity on a volume on a second file server corresponding to the at least one of the volumes on the first file server, the notice received over the network from the replication module; and
   a processing unit to perform the activity on the first file server.

24. A system according to claim 23 wherein the registration unit includes:
   a product identification unit to receive the replication module;
   a volume identification unit to identify the at least one of the volumes on the first file server for which the replication module will operate; and
   means for binding the replication module to the at least one of the volumes.

25. A system according to claim 24 wherein the means for binding the replication module to the at least one of the volumes includes links between the replication module and the at least one of the volumes.

26. A system according to claim 23 wherein the system further includes:
   a detection unit to detect an activity on the first file server that the replication module watches; and
   a message to submit the activity to the replication module.

27. A method to support file replication to maintain consistency among files across at least a first and second file server connected by a network, the first file server coupled to a first infrastructure and storing one or more volumes of files and the second file server coupled to a second infrastructure, the method comprising:
   registering a first replication module with the first infrastructure on the first file server; and
   detecting an activity on the first file server with the first infrastructure that the first replication module watches; and
   submitting the activity from the first infrastructure to the first replication module;
   transmitting the activity across the network from the first replication module to a second replication module registered with the second infrastructure;
   giving notification from the second replication module to the second infrastructure at the second file server of an activity on the first file server over the network; and
   performing the activity by the second infrastructure on the second file server.

28. A system comprising:
   a first file replication infrastructure coupled to a first file server storing one or more volumes of files for supporting file replication among a plurality of second file servers connected by a network, each second file server coupled to a second infrastructure, wherein the first file replication infrastructure includes a computer-readable medium containing a program comprising:
      registration software to register a replication module with the first infrastructure on the first file server for at least one of the volumes on the first file server; and
      processing software to pass activities on the at least one of the volumes on the first file server to the replication module; and
   a replication module for registration with the first replication infrastructure on the first file server, wherein the replication module includes a computer-readable medium containing a program comprising:
      reception software to receive the activities from the first infrastructure;

ranking software to rank the activities according to a plurality of criteria;
ordering software to order the activities into an activity order for replication according to the activity rankings; and
communications software to send the activities in the activity order to the second infrastructure coupled to one of the second file servers.

29. A method for using an infrastructure coupled to a first file server storing one or more volumes of files to support file replication among a plurality of second file servers connected by a network, each second file server coupled to a second infrastructure, the method comprising:
   registering a replication module with the first infrastructure on the first file server, including:
      receiving the replication module;
      receiving an identifier for at least one of the volumes on the first file server for which the replication module will operate; and
      binding the replication module to the at least one of the volumes; and processing changes on the first file server using the replication module.

30. A method according to claim 29 wherein registering a replication module further includes:
   receiving a list of activities that the replication module watches; and
   binding the list of activities to the replication module and the at least one of the volumes.

31. A method according to claim 29 wherein binding the replication module includes:
   unbinding a first replication module on the first file server from at least one of the volumes to which the replication module is bound; and
   binding the replication module to the at least one of the volumes.

32. A method for using an infrastructure coupled to a first file server storing one or more volumes of files to support file replication among a plurality of second file servers connected by a network, each second file server coupled to a second infrastructure, the method comprising:
   registering a replication module with the first infrastructure on the first file server, including unbinding the replication module on the first file server from at least one of the volumes to which the replication module is bound; and
   processing changes on the first file server using the replication module.

33. A method for using an infrastructure coupled to a first file server storing one or more volumes of files to support file replication among a plurality of second file servers connected by a network, each second file server coupled to a second infrastructure, the method comprising:
   registering a replication module with the first infrastructure on the first file server;
   processing changes on the first file server using the replication module; and
   un-registering the replication module from the first infrastructure on the first file server, including unbinding the replication module from all volumes to which the replication module is bound.

34. A first infrastructure coupled to a first file server storing one or more volumes of files for supporting file replication among a plurality of second file servers connected by a network, each second file server coupled to a second infrastructure, the first infrastructure including a computer-readable medium containing a program comprising:
   registration software to register a replication module with the first infrastructure on the first file server, including:
      product identification software to receive the replication module;
      volume identification software to identify at least one of the volumes on the first file server for which the replication module will operate; and
      binding software to bind the replication module to the at least one of the volumes; and
   processing software to process changes to the first file server.

35. A first infrastructure according to claim 34 wherein the binding software includes a binding data structure to bind the replication module to the at least one of the volumes.

36. A system for a first infrastructure coupled to a first file server storing one or more volumes of files to support file replication among a plurality of second file servers connected by a network, each second file server coupled to a second infrastructure, the system comprising:
   a registration unit to register a replication module with the first infrastructure on the first file server, including:
      a product identification unit to receive the replication module;
      a volume identification unit to identify at least one of the volumes on the first file server for which the replication module will operate; and
      means for binding the replication module to the at least one of the volumes;
   a message reception unit to receive notice of an activity on a second file server over the network from the replication module; and
   a processing unit to perform the activity on the first file server.

37. A system according to claim 36 wherein the means for binding the replication module to the at least one of the volumes includes links between the replication module and the at least one of the volumes.

* * * * *